United States Patent [19]

Matkan

[11] 4,447,516

[45] May 8, 1984

[54] DRY TONER AND METHOD OF MAKING SAME

[75] Inventor: Josef Matkan, Adelaide, Australia

[73] Assignee: Research Hildings Pty. Limited, Eastwood, Australia

[21] Appl. No.: 432,944

[22] PCT Filed: Feb. 3, 1982

[86] PCT No.: PCT/AU82/00006

§ 371 Date: Sep. 22, 1982

§ 102(e) Date: Sep. 22, 1982

[87] PCT Pub. No.: WO82/02676

PCT Pub. Date: Aug. 19, 1982

[30] Foreign Application Priority Data

Mar. 6, 1981 [AU] Australia ............................ PE7512

[51] Int. Cl.$^3$ ............................................ G03G 9/08
[52] U.S. Cl. .................................... 430/109; 430/137; 430/138
[58] Field of Search ............... 430/107, 109, 111, 114, 430/138; 252/316; 428/403

[56] References Cited

U.S. PATENT DOCUMENTS 1,497,747  6/1924  Wieland .............................. 430/138
3,732,172  5/1973  Herbig ................................ 252/316
4,307,169 12/1981  Metkan .............................. 430/138

*Primary Examiner*—John E. Kittle
*Assistant Examiner*—John L. Goodrow
*Attorney, Agent, or Firm*—Kinzer, Plyer, Dorn & McEachran

[57] ABSTRACT

Microcapsular electroscopic marking particles produced by the interfacial polycondensation process using a volatile solvent for production of its pressure fixable marking medium and having a polymeric shell which is discontinuous at least during heat drying of the particles to allow the volatile solvent to be expelled from the particle.

13 Claims, No Drawings

DRY TONER AND METHOD OF MAKING SAME

BACKGROUND OF THE INVENTION

It is well known to tone electrostatic latent images contained on photoconductive or dielectric surfaces by application thereto of electroscopic marking particles. It is also known to have electroscopic marking particles in dry form which can be fixed by pressure onto the photoconductor which may comprise a sheet of paper coated with photoconductive zinc oxide in a resinous binder or which electroscopic marking particles can be transferred from the photoconductor onto plain paper and affixed thereto by pressure. Electroscopic marking particles which can be fixed by pressure are generally referred to as pressure fixing dry toner.

Pressure fixing dry toner composition of encapsulated and non-encapsulated type are also well known. Encapsulated toners are disclosed for instance in U.S. Pat. Nos. 3,080,250, 3,080,251, 3,080,318, 3,893,932 and 3,893,933. Pressure fixing toners of non-encapsulated type are disclosed for instance in U.S. Pat. Nos. 3,788,994, 3,804,764, 3,873,325, 3,903,320 and 3,925,219.

Encapsulated dry toners of the prior art methods disclosed have inherent limitations with regards particle size control, quantity and type of colouring matter which can be encapsulated, capsular shell thickness and inertness. In each of the prior art disclosures the fixing pressures disclosed are very high, being generally within the range 200-500 pounds/lineal inch. In the past it was considered that pressure fixing toners were of necessity formulated to require high fixing pressure in order that such materials should possess suitable physical characteristics for normal handling purposes.

In our co-pending U.S. patent application Ser. No. 958,009 dated Nov. 6, 1978 (based on Australian Patent Application No. PD 2374/77 dated Nov. 10, 1977), entitled "Microcapsular Electroscopic Marking Particles" and in co-pending International Application No. PCT/AU81/00179 dated Dec. 3, 1981 (based on Australian Patent Application No. PE6894/80 dated Dec. 11, 1980), entitled "Dry Toner for Electrostatography" there are disclosed electroscopic marking particles that is dry toner material in the form of microcapsules of controlled size wherein high intensity colouring matter can be encapsulated within an inert capsular shell and wherein such capsular shell allows fixing by relatively low pressure yet permits easy handling of the dry toner material. Such electroscopic marking particles are prepared in the form of microcapsules following in general the encapsulation teachings of H. Ruus as disclosed in U.S. Pat. No. 3,429,827 and G. E. Maalouf as disclosed in U.S. Pat. No. 4,000,087, each of which is incorporated herein by reference. The technique disclosed therein is generally referred to as interfacial polycondensation, in which process a non-aqueous phase containing one reacting material is emulsified in an aqueous phase containing a second reacting material. Reaction is arranged to occur under constant agitation to produce microdroplets of the non-aqueous phase encapsulated in a shell comprising the reaction product formed at the phase interface, such shell preferably comprising a substantially impervious polyamide or other polymeric compound.

The microcapsular electroscopic marking particles in accordance with our co-pending applications comprise coloured encapsulated pressure fixable substance contained within a rupturable shell and a residue layer over such shell.

The substance to be encapsulated comprises in essence an ink, a first reactive substance and a carrier for said ink and said first reactive substance.

The ink in accordance with out co-pending applications comprises colouring matter which may be organic or inorganic pigment, magnetite or ferrite or other magnetizable substances, dyes which may be present in particulate state or in dissolved state or in absorbed or adsorbed state associated with the pigment or magnetizable substance, binder material for said colouring matter such as mineral and vegetable oils, natural and synthetic resins, bituminous substances, rubber or other elastomers, waxes, plasticizers, aliphatic or aromatic hydrocarbon solvents, anti-oxidants, viscosity modifying agents, metallic soaps, alkyl aryl compounds, phosphatides such as lecithin, bitumens or asphalts, sulphur containing compounds such as sulphosuccinates and such like substances.

The carrier medium for said ink may comprise a solvent or a plasticizer such as for instance dibutyl phthalate or the like substance having dispersed therein said ink and having dissolved therein said first reactive substance.

To form for instance a polyamide shell in accordance with the interfacial polycondensation process there is first prepared a water phase that is an aqueous solution of an emulsion stabilizer such as polyvinyl alcohol or hydroxy ethyl cellulose or cellulose gum or albumin and the like and then in such solution the aforementioned substance to be encapsulated is dispersed to form an emulsion. Following such emulsification of said substance to be encapsulated the second reactive substance which is an amine containing substance such as diethylene triamine or the like in aqueous solution which may also contain a pH stabilizer such as sodium carbonate or the like is added to such emulsion under agitation and such agitation is continued for some time until a polycondensation product that is polyamide is formed as a shell at the interface between the emulsified droplets or globules of the substance to be encapsulated and said water phase due to reaction between said first and second reactive substances contained in said substance to be encapsulated and said water phase, respectively.

Said water phase may also contain therein in dispersed or dissolved state protective colloids and surface active agents of the anionic, cationic or nonionic type and the like, which substances may adsorb onto or be absorbed by or react in part with the shell.

Upon completion of the interfacial polycondensation process there is formed an aqueous slurry containing therein in suspended state microcapsules and in dissolved or dispersed state at least part of the aforementioned emulsion stabilizer, protective colloid and surface active agent. Such slurry can be spray dried to form discrete capsular particles which contain on the outer shell wall in dry form and adsorbed thereto or absorbed thereby or at least in part reacted therewith a residue layer consisting of said emulsion stabilizer, protective colloid and surface active agent, such dry discrete capsular particles or agglomerates thereof constituting the electroscopic marking particles.

The dry toner powder material in accordance with our co-pending applications is characterised by forming high colour density images as the interfacial polycondensation process lends itself admirably to the inclusion of substantial quantity of colouring matter into the toner produced by such process. In addition to the incorporation of pigments and dyes into the ink which forms part of the encapsulated substance it is also possible to include dyes in dissolved or dispersed state, where such dyes can be dissolved or dispersed in the binder materials for the pigment as previously listed or in the carrier medium such as dibutyl phthalate and the like. Furthermore dyes can be included in the aqueous phase together with the emulsion stabilizer where upon drying such dye is found to be contained on the outside of the capsular shell and bonded thereto by the said emulsion stabilizer. It is also possible to have dyes adsorbed onto the pigment prior to incorporation thereof in said ink in which case such pigment is dyed firstly by milling or mixing in a dye solution and then dried prior to inclusion into the ink with the binder materials.

The pigments and dyes referred to in the foregoing must be so selected that they do not react in ay way with the aforementioned two reactive substances and in particular such dyes must not contain free amine groups which may react with the first reactive substance acid chloride.

In those cases where water dispersible or hydrophilic pigments such as magnetite, ferrite, magnetizable materials and other such like substances are included in the encapsulated substance it is necessary to protect such materials from interaction with the aforementioned first reactive substance and render such materials oil dispersible or oleophilic in order to prevent migration of such particulate matter from the oil phase of the ink in the substance to be encapsulated or from the carrier medium into the aqueous outer phase as such migration precludes effective encapsulation.

Such hydrophilic particulate substances can be protected as well as rendered oleophilic by for instance treating or coating the particle surface with silicones either by the so-called fuming process or by wetting or grinding the particles in a solution of silicones followed by removing the solvent, or by coating the particles by any known method of grinding or dispersing in a solution or hot melt of materials such as natural and synthetic waxes such as polyethylene, oils, synthetic resins such as ketone resins, epichlorhydrin polymers, urethanes, polycarbonates, phthalates, acrylics and styrenes, where some of such materials and in particular the acrylics and styrenes can be applied in substantially monomeric form and subsequently polymerized on the particle surface by known methhods.

While the shell of such microcapsular electroscopic marking particles is not affected by environmental conditions certain emulsion stabilizers such as polyvinyl alcohol which remain on the shell surface upon drying are somewhat affected by moisture and thus it is desirable to render the residual emulsion stabilizer water insoluble which for instance in the case of polyvinyl alcohol can be attained by adding to the aqueous slurry upon completion of the encapsulation process whilst agitating same for some time a water soluble resin such as a melamine resin which reacts with polyvinyl alcohol and renders same water insoluble. Residual emulsion stabilizer or protective colloidsor surface active agents can of course be substantially reduced in quantity by washing the microcapsules with water prior to insolubizing the emulsion stabilizer and if so desired also after insolubilization in order to remove traces of unreacted materials. Alternatively in those instances where the emulsion stabilizer is albumin, it is rendered water insoluble and hydrophobic during the step of spray drying at temperatures above 100° C.

The dry toner powder material consisting of microcapsular electroscopic marking particles in accordance with out co-pending applications can be of polarity suitable for toning of latent images formed by positive or negative electrostatic charges, as desired. Such dry toner powder can be admixed with iron filings for operation in the well known magnetic brush applicators, or with other carrier particles for operation in other toner applicators for instance of the cascade type as is well known. Alternatively in those instances where the encapsulated substance contains magnetite or ferrite or other magnetizable material such dry powder can be employed as a single component toner with a multi magnet roller applicator as is also well known. The dry powder can be applied to tone directly latent images contained on a dielectric or photoconductive surface such as zinc oxide coated paper and fixed thereto or such powder can be employed to tone latent images contained on reusable photoconductors followed by transfer onto plain paper and fixing thereto.

In all instances the toner material can be pressure fixed to the final surfaces by for instance passage through the nip of a pair of pressure rollers which may be heated if so desired where the pressure applied between such rollers can be of lower order than that required for pressure fixing toners of the prior art.

It will be noted that the marking particles produced in accordance with our co-pending applications contain an ink to be encapsulated and a carrier medium for same comprising materials such as polybutene oil, dehydrated castor oil, high boiling range (207°–257° C.) isoparaffinic hydrocarbon, dibutyl phthalate and such like relatively non-volatile liquids which in the course of spray drying at elevated temperatures do not evaporate completely from the capsules. We have found that if the shell of such capsules containing relatively non-volatile liquids is damaged by shear forces or impact during production or in handling such as during spray drying or classification or packaging or during use in a toner applicator, the non-volatile liquid contained therein becomes exposed and upon contact with other capsules acts as adhesive causing cementing together of capsules which then form agglomerates. Such agglomerates formed by capules or toner particles impair the flow properties of the toner in the toner applicator which results in inferior toning efficiency and poor image quality.

SUMMARY OF THE INVENTION

It is the object of the present invention to provide electroscopic marking particles prepared in essence by the process of interfacial polycondensation followed by spray drying, which particles do not form agglomerates and are free flowing.

Another object of the present invention is to provide electroscopic marking particles which do not contain non-volatile liquids.

A further object of the present invention is to provide electroscopic marking particles which if damaged in the course of production or handling do not affect toning efficiency.

Yet another object of the present invention is to provide electroscopic marking particles by a production method wherein the process of interfacial polycondensation is employed mainly for the purpose of forming discrete particles of controlled size.

The above objects and other advantages are accomplished in accordance with this invention by employing in the ink and carrier for the same as the only liquid constituents only volatile solvents having a boiling range below the temperature of spray drying whereby all such liquid matter contained within the particles is evaporated in the course of spray drying. The resulting particles do not contain any liquid and thus if they become damaged by shear forces or impact they do not adhere to other particles and thus do not cause agglomeration.

DESCRIPTION OF THE INVENTION

In accordance with the present invention electroscopic marking particles are prepared by the interfacial polycondensation process substantially as disclosed in our co-pending applications and as described in the foregoing, except that no relatively non-volatile or high boiling range liquids are employed in the ink and in the carrier for the same and for the first reactive substance.

In the interfacial polycondensation process there is need for a liquid material as described in the foregoing to reduce the viscosity of the ink firstly for milling or mixing purposes and secondly for emulsification. In the step of emulsification the ink may be admixed with a carrier liquid which contains dissolved therein the first reactive substance. Thus the material which is emulsified comprises a mixture of the ink and of the carrier liquid and such mixtures has to be of relatively low viscosity to allow emulsification in the form of droplets of controlled size as the inner phase and then to permit migration of the first reactive substance to the interface for reaction with the second reactive substance contained in the outer phase of the emulsion.

We have found that various volatile solvents such as aliphatic, aromatic and halogenated hydrocarbons, ketones and the like and mixtures thereof can be incorporated in the ink to reduce its viscosity to the desired level and can be used as the carrier for same and for the first reactive substance as complete replacement for oils, plasticisers and other such like relatively non-volatile liquids. Furthermore we have found that if such volatile solvent is so selected that its boiling range is below the inlet air temperature of the spray dryer or below some temperature reach in the spray drying chamber, it is possible to remove completely such solvent from the particles in the course of and by the mere act of spray drying. We have found that when the spray drying temperature is above the boiling range of the volatile solvent, such solvent firstly volatilizes fully or at least in part within the particle or capsule and then escapes therefrom as vapor by bursting the shell or diffusion through the shell or evaporation from an already damaged portion thereof.

The thus produced toner particles are completely free of liquid matter and do not give rise to agglomeration. The toner is free flowing in toner applicators and provides for efficient toning. In addition the production process of such toner has the advantage that during spray drying the particles do not adhere to the walls or parts of the drying chamber because after removal by vaporisation of the solvent therefrom, they do not contain oils or non-volatile liquids which could render the surface of the particles adhesive.

Scanning Electron Microscope (SEM) examination showed that the toner particles thus produced upon spray drying lost their identity in most cases as substantially spherical capsules in that the particles show either a deflation effect due to solvent loss through one or more craters or punctures or breaks in the shell or surface, or a spherodising effect caused by melting of the ink which had been exposed due to prior damage of the shell or due to incomplete encapsulation. Thus it can be said that the electroscopic marking particles produced in accordance with this invention differ essentially from the prior art particles of the non-encapsulated type in that they are not constituted by jet milled or otherwise pulverised or spherodised polymeric substance and they also differ essentially from the prior art particles of the encapsulated type disclosed in published patents as cited in the foregoing and as disclosed in our co-pending applications in that they are not comprising a core material encapsulated within a continuous shell. It will be therefore realised that in accordance with the present invention the process of interfacial polycondensation is employed not so much for the purpose of producing capsular toner material comprising particles consisting of a distinctly encapsulated core material fully surrounded by a shell of distinctly different composition than said core material, but only for the purpose of producing discrete particles of controlled size by emulsification and then forming shells around such particles not necessarily for the purpose of encapsulation of the final toner material but only to protect such discrete particles and to maintain them in discrete form for spray drying.

It will be realised that although the flow properties of the toner particles in accordance with this invention are per se very good due to the absence of non-volatile liquids therein and hence a very low tendency for agglomeration, for the purpose of handling, packaging and feeding as well as recycling in certain high speed toner applicators it has been found advantageous to incorporate with the particles substances such as colloidal silica, aluminum silicate, calcium silicate and such like flow improvers. Such flow improving substances can be admixed with the dry toner particles or alternatively they can be dispersed in the aqueous outer phase before or after the ink is emulsified or interfacial polycondensation occurs and in such cases upon spray drying the slurry the flow improving substance becomes evenly distributed between the dry particles and in some instances at least in part bonded to their surface.

In order to increase the electrical conductivity of the toner of this invention as required in certain applications, it is possible to admix conductive particulate material such as carbon black pigment with the toner particles. This can be attained for instance by dispersing a preferably aqueous suspension or dispersion of carbon black in the aqueous outer phase after emulsification of the ink and before or after interfacial polycondensation, depending whether it is desired to firmly attach the carbon black particles to the toner particles or to have such carbon black particles in the form of a coating on the toner particle surface as will be the case if they are added after interfacial polycondensation.

PREFERRED EMBODIMENTS

The following Examples will serve to further illustrate the present invention.

EXAMPLE 1

An ink for a pressure fixable toner composition was prepared as follows:
Polyethylene wax, softening point 60° C.: 7.2 grms Isoparaffinic hydrocarbon, boiling range 160°–172° C., flash point 41° C., Sp Gr 0.750: 35.0 grms
Lecithin: 2.0 grms
Carbon black: 5.8 grms
Hydrophobic magnetite, oil absorption 40%, axial ratio about 8:1, particle length about 0.35 micron: 50.0 grms were milled in a heated ball mill for 4 hours at a temperature of 91°–93° C.

The first reactive substance terephthaloyl chloride, 2.9 grms, was dissolved in the same isoparaffinic hydrocarbon, 1.5 grms, and the solution was blended with 50 grms of the previously prepared ink.

An emulsification solution was prepared by dissolving sodium carbonate, 1.7 grms, in water, 65.8 grms, followed by the addition with stirring of spray dried albumin, 0.3 grms, as the emulsion stabilizer. The thus formed solution was further diluted with water, 216 grms, the diluted solution being stirred constantly for about 10 minutes.

The ink containing the first reactive substance and the emulsification solution at 20° C. were charged into a Waring blender to emulsify the ink in the form of microdroplets in the size range 2–35 microns suspended in the emulsification solution. The emulsification time was 30 seconds.

The second reactive substance diethylene triamine, 1.7 grms, was dissolved in distilled water, 23.5 grms, and the solution was stirred into the emulsion. Stirring was continued at slow speed for 2 hours, during which time an interfacial polycondensation reaction took place between the diethylene triamine and the terephthaloyl chloride to form polyamide shells around the ink droplets. The thus formed microcapsules were in a state of suspension in what can be termed as an aqueous slurry containing at least part of the emulsion stabiliser in dissolved state therein. The microcapsules were generally within the size range 3–40 microns.

The slurry was spray dried in a Bowen Spray-Aire laboratory spray drier, feed rate 100 ml/minute, air inlet temperatures 200° C., outlet temperature 130° C.

The spray dried particles were found to be very free flowing. SEM examination showed the dried particles to be of collapsed shape in the size range 2–35 microns. Such reduction in size was caused mainly by solvent loss during spray drying through discontinuities in the shell. Overall particle spherodisation due to ink material becoming molten in the course of spray drying was also noted.

The spray dried particles containing about 60–65% by weight magnetite formed electroscopic marking particles and were used as single component magnetic toner with a rotating multi-magnet applicator to tone an electrostatic latent image on a charged and exposed binder type zinc oxide photoconductive recording paper. The toner deposit was subsequently transferred electrostatically to bond paper and fixed thereto by passage through a pair of pressure rollers. The fixing pressure was 100 lbs per lineal inch (18 kilograms per lineal centimeter).

EXAMPLE 2

Example 1 was repeated, with the exception that the albumin containing emulsification solution was replaced with polyvinyl alcohol, 1.25 grms, dissolved in distilled water, 125 grms.

Prior to spray drying most of the polyvinyl alcohol was removed from the slurry by elutriation.

EXAMPLE 3

Example 2 was repeated with the exception that the elutriated slurry was treated with a reactive melamine condensate prior to spray drying to insolubilize the remaining polyvinyl alcohol. The reactive melamine condensate was water soluble, viscosity 170 cps at 25° C., pH 8.2–8.8. To the elutriated slurry 400 mg of the melamine condensate were added and the pH was adjusted to 5. The slurry was stirred at slow speed for 24 hours to react the polyvinyl alcohol with the melamine condensate. The slurry was then spray dried.

EXAMPLES 4, 5 AND 6

The isoparaffinic hydrocarbon of Examples 1, 2 and 3 was replaced with a solvent mixture comprising
Methylene chloride, boiling point 40.7° C.: 18 grms
Methyl ethyl ketone, boiling point 79.57° C.: 17 grms

EXAMPLES 7, 8 AND 9

The isoparaffinic hydrocarbon of Examples 1, 2 and 3 was replaced with an equal weight of carbon tetrachloride, boiling point 76.75° C.

EXAMPLES 10, 11 AND 12

The isoparaffinic hydrocarbon of Examples 1, 2 and 3 was replaced with a solvent mixture comprising
n-butyl acetate, boiling point 126.5° C.: 10 grms
Toluene, boiling point 110.6° C.: 25 grms

EXAMPLES 13 TO 24

Each of the Examples 1 to 12 was repeated with the exception that after emulsification but before interfacial polycondensation an aqueous carbon suspension was added to the slurry in the following proportions
Carbon suspension, 40% carbon by weight: 12 grms
Ink slurry, ink content: 50 grms
The carbon suspension was stirred into the ink slurry for 15 seconds prior to the addition of the diethylene triamine solution.

After spray drying, the electrical resistivities of the toners were found to be about $10^5$ ohm cm. The toners which had been produced with the emulsion stabiliser polyvinyl alcohol were found to be usable mainly in Electrofax type office copying machines, whereas the toners which had been produced with the emulsification solution containing albumin were found to be usable in a transfer type copier employing selenium as the photoconductor.

EXAMPLES 25 TO 36

Each of Examples 13 to 24 was repeated, however in this instance the carbon suspension was added after interfacial polycondensation, and before spray drying. The thus produced toners were usable as in Examples 13 to 24.

EXAMPLES 37 TO 48

Each of Examples 1 to 12 was repeated with the exception that the hydrophobic magnetite was omitted from the ink and the carbon black content was increased to 14.5 grms.

In each instance the dried particles formed electroscopic marking particles and were used as two component developer admixed with magnetizable carrier particles in a magnetic brush applicator to tone a negatively charged electrostatic latent image on a charged and exposed binder type zinc oxide photoconductive recording paper. The image deposit was pressure fixed by passage through a pair of pressure rollers at a pressure of 100 lbs/lineal inch (18 kilograms per lineal centimeter).

EXAMPLE 49

An ink for a pressure fixable core composition was prepared as in Example 1.

The first reactive substance terephthaloyl chloride, 5 grms, was dissolved in the same isoparaffinic hydrocarbon, 3 grms, and the solution was blended with 50 grms of the previously prepared ink.

An emulsification solution was prepared by dissolving sodium carbonate, 1.7 grms, in water, 65.8 grms, followed by the addition with stirring of spray dried albumin, 0.3 grms. The thus formed solution was further diluted with water, 216 grms, the diluted solution being stirred constantly for about 10 minutes.

The emulsification solution at 20° C. and the ink containing the first reactive substance were charged into a Waring blender to emulsify the ink in the form of microdroplets in the size range 2-35 microns suspended in the emulsification solution. The emulsification time was 30 seconds.

The second reactive substance resorcinol, 2.8 grms, was dissolved in distilled water, 23.5 grms, and the solution was stirred into the emulsion. Stirring was continued at slow speed for 2 hours, during which time an interfacial polycondensation reaction took place between the terephthaloyl chloride and the resorcinol to form polyester shells around the ink droplets.

The slurry was spray dried as in Example 1, to produce spray dried particles which were used as single component magnetic toner as in Example 1.

EXAMPLES 50–60

Each of Examples 2-12 was repeated using the first and second reactive materials of Example 49.

EXAMPLE 61

An ink for a pressure fixable core composition was prepared as follows
Synthetic wax, as in Example 1: 600 grms
Isoparaffinic hydrocarbon, as in Example 1: 2000 grms
Aniline Black, Colour Index Number 50,440: 750 grms
Hydrophobic magnetite, as in Example 1: 1000 grms
were milled in a heated ball mill for 4 hours at a temperature of 90° C.

The first reactive substance 4, 4′ diphenylmethane diisocyanate, 8.6 grms, was blended with 50 grms of the previously prepared ink.

An emulsification solution was prepared by dissolving sodium carbonate, 1.7 grms, in water, 65.8 grms, followed by the addition with stirring of spray dried albumin, 0.3 grms. The thus formed solution was further diluted with water, 216 grms, and stirred constantly for about 10 minutes.

The ink containing the first reactive substance, together with the emulsification solution at 20° C., was charged into a Waring blender to emulsify the ink in the form of microdroplets in the size range 2-35 microns suspended in the emulsification solution. The emulsification time was 30 seconds.

The second reactive substance, diethylene triamine, 1.8 grms, was dissolved in water, 12.5 grms, and the solution was stirred into the emulsion. Stirring was continued at slow speed for about 12 hours, during which time an interfacial polycondensation reaction took place between the 4, 4′ diphenylmethane diisocyanate and the diethylene triamine to form polyurea shells around the ink droplets.

The slurry was spray dried as in Example 1 to produce dried particles which were used as single component magnetic toner as in Example 1.

EXAMPLES 62 TO 72

Examples 2-12 were repeated using the first and second reactive substances of Example 61.

It should be pointed out that single component toners for direct type Electrofax copiers can be normally of the conductive or semiconductive type, whereas single component toners for transfer onto plain paper type copiers, that is where the image prior to transfer is formed on a zinc oxide binder type photoconductive recording member or selenium or other photoconductor can normally be more insulative in nature.

There have been disclosed pressure fixable electroscopic marking particles prepared in the form of microcapsules by the process of interfacial polycondensation followed by spray drying at temperatures at which substantially all of the volatile matter contained in the microcapsules is evaporated through discontinuities in the outer layer thereof and at which temperatures at least part of the non-volatile matter contained in such particles becomes molten and exudes to and covers at least part of the surface thereof. The Examples and the materials given in the foregoing are intended to be read in the illustrative and not restrictive sense.

I claim:

1. The method of preparation of electroscopic marking particles having a predetermined temperature for spray drying thereof comprising the steps of
    forming for each particle a core of pressure fixable material containing as its liquid phase a volatile solvent having a boiling point appreciably below said temperature,
    encapsulating the said core in a polymeric shell, and
    spray drying the encapsulated material at least at said predetermined temperature thereby expelling the said volatile solvent from the said core through discontinuities created in the said shell as an incident to volatilization of the solvent by the application of heat
    whereby to produce dry generally solvent-free particles.

2. A method for the preparation of electroscopic marking particles by spray drying at a predetermined temperature comprising the steps of
    blending colouring matter, pressure fixable material and volatile solvent therefore to form an ink, said solvent having a boiling point appreciably below said temperature,
    adding to said ink a first reactive substance and homogenising said first reactive substance with said ink,
    preparing an aqueous phase emulsification solution containing a water soluble emulsion stabiliser and a pH stabiliser,
    emulsifying said ink containing said first reactive substance in said emulsification solution in the form of droplets,
    adding to said emulsion an aqueous solution of a second reactive substance,
    stirring said emulsion with said aqueous solution of said second reactive substance to allow reaction between said first reactive substance and said second reactive substance to encapsulate said emulsified ink droplets by forming a protective polymeric shell around said emulsified ink droplets to temporarily contain said volatile solvent within said ink droplets, and spray drying the so formed capsule slurry at least at said temperature to produce dry electroscopic marking particles, characterised by said volatile solvent contained in said ink being evaporated from within the shell during said spray drying step.

3. A method for the preparation of electroscopic marking particles according to claim 2 further characterised by said volatile solvent contained in said ink being evaporated during said spray drying step through discontinuities in said shell formed by pressure induced bursting of said shell as said volatile solvent boils and-/or volatilises.

4. A method for the preparation of electroscopic marking particles as disclosed in claim 2, further characterised by said volatile solvent contained in said ink having a boiling point lower than the spray drier inlet air temperature.

5. A method for the preparation of electroscopic marking particles as claimed in claim 4 further characterised in that the said volatile solvent is taken from the group of aliphatic, aromatic and halogenated hydrocarbons, ketones and mixtures thereof.

6. A method for the preparation of electroscopic marking particles according to claim 5 further characterised in that the said volatile solvent contains the said first reactive substance.

7. A method for the preparation of electroscopic marking particles according to claim 2 wherein the said ink includes as its only liquid phase a solvent means having a boiling range below the temperature of the spray drying, whereby the liquid phase is evaporated during spray drying through discontinuities in the said shell to leave the particles solvent-free.

8. Microcapsular electroscopic marking particles obtained by drying at a predetermined temperature and each comprising a core of a pressure fixable material in a substantially dry solventless state encased within a discontinuous polymeric shell through which solvent for the ink has been expelled by drying at a temperature in excess of the boiling point of the ink solvent.

9. Microcapsular electroscopic marking particles according to claim 8 formed by the general process of
combining marking matter, pressure fixable material, a volatile solvent and a first reactive substance to form an ink dissolved in said solvent, forming ink droplets by subjecting said solution to emulsification, encapsulating the said ink droplets by use of a second reactive substance which is reactive with the said first reactive substance to produce a slurry in which said substances are allowed to react to form discrete shells encapsulating ink droplets, and spraying drying the encapsulated ink droplets, characterised in that said solvent expands substantially completely through discontinuities in the said shell during spray drying to result in dry generally solvent free microcapsular particles.

10. Microcapsular electroscopic marking particles according to claim 9 in which the said discontinuities are openings caused by solvent vapor pressure.

11. Microcapsular electroscopic marking particles of shell form produced by interfacial polycondensation using a volatile solvent to dissolve a pressure fixable marking medium surrounded by a polymeric shell obtained by polycondensation, said shell being rendered discontinuous at least during heat drying of the particles at a temperature above the boiling point of the solvent to allow the volatile solvent to expand and be expelled through the shell.

12. Microcapsular electroscopic marking particles produced by the interfacial polycondensation process in which a volatile solvent is used to dissolve a pressure fixable marking medium, characterised in that each particle includes a polymeric shell rendered discontinuous during heat drying of the particles at a temperature above the boiling point of the solvent to allow expelling of the volatile solvent during drying.

13. Microcapsular electroscopic marking particles according to claim 12 wherein the said discontinuities are formed by bursting of the said shell due to solvent expansion during heat drying.

* * * * *

UNITED STATES PATENT AND TRADEMARK OFFICE
CERTIFICATE OF CORRECTION

PATENT NO. : 4,447,516
DATED : May 8, 1984
INVENTOR(S) : Josef Matkan

It is certified that error appears in the above—identified patent and that said Letters Patent is hereby corrected as shown below:

Cover page, change "Research Hildings Pty. Limited"

to --Research Holdings Pty. Limited--.

Signed and Sealed this

Twentieth Day of November 1984

[SEAL]

Attest:

GERALD J. MOSSINGHOFF

*Attesting Officer*   *Commissioner of Patents and Trademarks*